United States Patent Office 3,545,921
Patented Dec. 8, 1970

3,545,921
SYNTHETIC HARMOTOME FROM
DE-EXOTHERMED KAOLIN
James E. McEvoy, Morton, Pa., assignor to Air Products and Chemicals, Inc., Philadelphia, Pa., a corporation of Delaware
No Drawing. Filed Sept. 7, 1967, Ser. No. 665,961
Int. Cl. C01b 33/28
U.S. Cl. 23—112                              3 Claims

ABSTRACT OF THE DISCLOSURE

An aluminosilicate composition comprising a zeolitic component resembling the natural zeolite identified as harmotome, is prepared from a precursor mixture of specially calcined kaolin, water and potassium hydroxide, such preparation further including as one of the precursors a small amount of crystalline zeolite selected from the group consisting of wellsite, phillipsite and/or harmotome. The wellsite, phillipsite and harmotome additive may be of natural or synthetic origin. The mixture prepared in proper porportions is subjected to an aging operation of extended time and possibly elevated temperature whereby the harmotome-type zeolite is synthesized in an amount ranging from 10 to 80% by weight of the calcined kaolin precursor.

BACKGROUND OF THE INVENTION

This invention relates to crystalline compounds of silicon having ion exchange properties. Such compounds are known generally as crystalline zeolites or molecular sieves. Types of materials thus identified are found in nature in varying composition and construction as well as in varying degrees of purity and quantity. Investigators have found and developed ways of synthesizing crystalline zeolites including most of the types found in nature and many types of new and distinctive character not known in nature. Many beneficial and practical fields of use have grown along with increasing knowledge in this field.

DESCRIPTION OF THE PRIOR ART

Three closely related natural zeolites are wellsite, phillipsite and harmotome. These have been studied and reported in some detail in many standard mineralogical texts. Inasmuch as the attention here is moer closely connected with the harmotomes the X-ray diffraction of natural harmotome as shown on ASTM Card 13–494 is given below in Table 1. According to this card the composition of the natural harmotome is shown as $(Ba_{.76}Ca_{.07}K_{.04}Na_{.20})O \cdot Al_2O_3 4.2SiO_2 \cdot 4.7H_2O$. There is another reference, not reproduced but generally similar to the material shown on ASTM 13–494, in the Fink Index (1965) on barium aluminum silicate, natural harmotome, ASTM Card 9–480.

In a paper by R. M. Barrer, L. Hinds and E. A. White published in 1953, starting on page 1466 of the Journal of the Chemical Society there is a description of the preparation and studies of a "New species M" which is set forth as having the probable formula $$K_2O, Al_2O_3, 3SiO_2, 3H_2O$$

The X-ray diffraction pattern of this material as shown in the Barrer et al. paper is given in Table 1 below. This particular form of zeolite appears as a derviation of analcite through base exchange treatment with a potassium salt to a form identified as leucite which, upon treatment with dilute potassium hydroxide at temperature below ~200°, showed the presence of species "M." Species "M" was likewise reported as a product of the hydrothermal treatment of gel $K_2O$, $Al_2O_3$, $3SiO_2$ in an excess of potassium hydroxide.

In the Journal of the Chemical Society, 1959, starting at page 195 there is an article by R. M. Barrer, J. W. Baynham, F. W. Bultitude, and W. M. Meier entitled "Hydrothermal Chemistry of the Silicates. Part VIII. Low Temperature Crystal Growth of Aluminosilicates, and of Some Gallium and Germanium Analogues." This article deals with numerous zeolitic types, both natural and synthetic. On page 203 is set forth the crystallization of gels, particularly an aqueous gel of $K_2O$, $Al_2O_3$, $4SiO_2$, $mH_2O$ whereby the effect of increasing amounts of sodium hydroxide during crystallization were observed. A product identified as a "harmotome-type zeolite" was obtained after 4 days at 150° C. when the gel composition, excluding water was 1.716 $Na_2O$, 1.00 $K_2O$, 1.00 $Al_2O_3$, 4.00 $SiO_2$ In the Journal of the Chemical Society, 1959, starting at page 1521 an article by R. M. Barrer, F. W. Bultitude and I. S. Kerr appears under the title "Some Properties of, and a Structural Scheme for, the Harmotome Zeolites." The identification studies were made on mineral samples synthesized as described in the two preceding Barrer et al. articles. The methods of identification and other information in the instant article are of interest for analytical purposes.

SUMMARY OF THE INVENTION

In accordance with this invention a method is given for the synthesis of aluminosilicate zeolite having no exact counterpart in either natural or in known synthetic compositions, yet having characteristics sufficiently similar in some respects to certain compositions classified as of the harmotome-type to be likewise identified as harmotome-type material. Synthesis is effected by a process which includes the steps of admixing a reactive clay, as hereinafter defined, and an aqueous solution of potassium hydroxide, the clay-water-potassium hydroxide of the resulting admixture having the respective weight ratios of 1–3:1.5–4:1 and further including in such admixture from 0.1 to 10.0 weight percent of the dry weight of the reactive clay of one or more of the group of zeolites consisting of wellsite, phillipsite and harmotome; the admixture thereafter being aged for a time period from about 10 hours to 10 days at a temperature in the range of ambient temperature, e.g. 25° C., to about 120° C., the time of aging being generally shorter at higher temperature. The product recovered after such aging comprises more than 10% by weight and up to about 80% by weight of potassium-form zeolite; in an aluminosilicate matrix, of a physical form and nature similar in a degree sufficient to be classified as harmotome-type zeolite and further constitutes the only identifiable zeolite-type composition present in the product.

GENERAL DETAILS AND DESCRIPTION OF THE INVENTION

The synthesis of this new harmotome-type zeolite material provides a reasonably controllable product having dependable and readily duplicated physical compositional qualities. This dependability makes the synthesized composition amenable to use in systems wherein molecular sieves and zeolitic-type crystalline materials are advantageous, particularly in such areas where the base exchange properties and sieve openings are relatively consistent and conform to requirements of the environment in which they may be employed. For instance, the zeolite of the present invention has molecular sieve openings generally with approximately 3 A. dimensional cross section and is thus suitable for molecular sieve separations of molecules having dimensions above and below the 3 A. size. The base exchange capacity of the harmotome-type zeolite synthesized by this invention lends itself to base exchange operations, such as encountered in water softening wherein the base exchange material should retain both physical integrity and its capacity for base exchange and regeneration through repeated cycles. In another area of marked utility the harmotome-type zeolite synthesized by this invention is amenable to adjustment of the ions held in the base exchange locations in a controllable manner wherein the potassium ion originally present can be replaced in large measure with one or more appropriate ions, such as $H^+$, to provide a material capable of effective catalyzing of certain organic reactions, such as cyclization and isomerization reactions.

The precursor components necessary to the synthesis of this useful zeolite include in addition to water and the potassium hydroxide as specified above, a reactive clay-derived component acting as the source of the silica and alumina required in the formation of the synthesized crystalline zeolite. This reactive clay-derived component is obtained through the controlled calcination of a Georgia-type kaolin well known to the clay industry.

In preparing the precursor material, such a kaolin reasonably free of extraneous materials such as sand and gravel, carbonates, iron and vanadium, either free or combined, and such other components as may be generally classified as unsuitable in porcelain grade kaolins has a recognizable X-ray diffraction pattern identifiable with that of the crystal, kaolinite.

Such a clay is made reactive for the present invention by a controlled calcination at a temperature within the range of about 950° C. to about 1200° C. for a time, generally within the range of about 10 minutes or less to about 3 hours, whereby substantially all of the kaolinite crystallinity has disappeared as would be evidenced by an X-ray diffraction study while at the same time producing a material having a response to X-ray examination by diffraction evidencing a substantially amorphous condition with no indication of the formation of any significant amount of aluminosilicate crystalline composition identifiable as mullite. A particularly effective calcination temperature has been found to lie within the range of about 1000 to 1050° C.

The potassium hydroxide is preferably of commercial grade purity or better. However, in the event other alkali hydroxides may be present, their presence should be less than 10% by weight of the total alkali hydroxide employed. If such diluent hydroxides are present they can be considered on the basis of their stoichiometric equivalency to the total requirement of the potassium hydroxide.

While the synthesis of harmotome-type zeolite may proceed with the formulation comprising the reactive-derived aluminodisilicate, water and potassium hydroxide within the described ranges, the purity and consistency does not necessarily have the dependability and reproducibility obtained through the procedure involving a type of seeding whereby less than 10% of one or more of the zeolite forms, namely wellsite, phillipsite and harmotome are added to the precursor mixture. It has been found that these additive seed crystals are effective regardless of their condition relative to ions occupying the base exchange sites so that such zeolites may have on the base exchange site cations or anions of divers nature without affecting any noticeable effect on the desired harmotome-type zeolite product.

Following admixture of the described components, the synthesis of the desired product can be obtained through aging of the admixture under suitable environmental control for a time period, such as of at least 10 hours up to about 10 days or more. Environmental control includes maintenance of the admixture under conditions such that there is no substantial loss of moisture from the aging admixture during the aging period. Another factor in the controlled aging is that of temperature which is in the range of ambient temperature, e.g., 25° C. to about 120° C. with the observation that the synthesis of the desired harmotome-type crystals is favored at higher temperatures and that longer time of aging is required at lower temperature. A particularly effective time and temperature combination is to be found in the time range of about 20 to about 48 hours at a temperature in the range of 90° to 100° C.

The choice of precursors in the prescribed ranges and the utilization of aging conditions within the prescribed limits should produce at least 10% crystalline zeolite of the synthetic harmotome product in an aluminosilicate matrix. While some requirements for product utilization find the composition containing about 10% of the synthetic harmotome satisfactory, generally a greater content of the synthetic harmotome will be found to be more useful and by proper selection of quantities of percursors and the ensuing aging procedure, the final product can contain as high as 80% of the thus synthesized harmotome-type zeolite.

A clearer understanding of the invention may be had by reference to the following examples.

EXAMPLE I

A sample of Georgia kaolin of "Paper Grade" quality was calcined in a rotary calciner at a temperature of 1030° C.±20° with a total elapsed time of approximately 2 hours. A sample of this calcined kaolin equilibrated to 50% moisture, was subjected to X-ray analysis and demonstrated in the absence of any recognizable kaolinite diffraction pattern and the absence of any recognizable mullite pattern and thus met the specifications of being a reactive aluminodisilicate precursor.

Four separate samples were prepared using this calcined kaolin as one of the ingredients.

| Material | A | B | C | D |
|---|---|---|---|---|
| Calcined clay, g | 225 | 225 | 225 | 225 |
| KOH pellets, g | 117 | 87 | 58 | 29 |
| Water, ml | 250 | 250 | 250 | 250 |
| Phillipsite, g | 12 | 12 | 12 | 12 |

The KOH pellets in each instance were dissolved in the indicated amount of water and added to the dry mixture of the calcined kaolin plus phillipsite. Each of the samples was stirred well for 4 minutes and covered to prevent moisture loss. The samples were placed in an oven maintained at a temperature of about 102–105° C. for a period of 36 hours. The samples were removed from the oven and allowed to cool. The cooled samples were washed three times with one liter of water each by the process of stirring, settling for ½ hour and decanting. The samples were then dried for 8 hours in an oven at about 120°–125° C. Portions of each of the dried samples were prepared for X-ray diffraction examination and showed the following results:

| A | B | C | D |
|---|---|---|---|
| d spacing, A. | d spacing, A. | d spacing, A. | d spacing, A. |
|  |  |  | 9.30 |
| 8.11 | 8.19 | 6.91 | 6.91 |
| 7.08 | 7.08 | | |
| 5.30 | 5.34 | | |
| 4.98 | 4.98 | | |
| 4.46 | 4.46 | | |
| 4.27 | 4.27 | | |
| 3.64 | 3.64 | 3.52 | 3.52 |
|  |  | 3.41 | |
| 3.24 | 3.24 | 3.37 | 3.24 |
|  |  | 3.12 | 3.13 |
| 3.16 | 3.16 | 3.16 | 3.05 |
| 2.91 | 2.94 | | |
| 2.76 | 2.73 | | |
| 2.72 | | | |
| 2.66 | 2.67 | | |
| 2.58 | 2.54 | | |

Referral of the above values for Samples A and B to the first column in Table 1 below shows a reasonable consistency of values and is of sufficient similarity to connote the identifiable zeolite content as a type of potassium harmotome. The values shown for Samples C and D were for very weak and blurred peaks. The material was other than a harmotome and thus shows the importance of the clay ratio in a proper formulation.

EXAMPLE II

A sample of commercially calcined Georgia kaolin available to the trade under the name of Satintone I, was employed as the calcined kaolin. This commercial material has a calcination history including a temperature in the range of 1000 to 1050° C. for a time of approximately 1 hour and exhibits upon X-ray diffraction examination an amorphous response, absent both kaolinite and mullite crystallinity of any recognizable pattern. An admixture was prepared consisting of 990 gms. of the calcined kaolin, 1100 gms. of water and 515 gms. of potassium hydroxide pellets. Added to this mixture with thorough stirring was 50 gms. of synthetic harmotome-type zeolite.

The KOH was dissolved in the water, cooled to 60° F., and placed in a kettle and the slurry was formed by mixing in the clay and the harmotome seed. The mixture was stirred at 100 r.p.m. as the temperature was brought to 140° F. and held for 2 hours. Thereafter the temperature was raised to 205–210° F. over a period of 2 hours and held at this temperature for 45 hours with no stirring.

At the end of the 45 hour aging period the solids were removed from the kettle and washed 3 times with approximately 1 liter of water containing 1% KOH and then washed 5 additional times with liter lots of hot water.

and exhibited no crystallinity identifiable as either kaolinite or mullite. Chemical analysis indicated the composition was approximately 2 parts of silica and 1 part of alumina. Of this clay material 49½ lbs. were added to a previously prepared solution consisting of 25¾ lbs. of potassium hydroxide dissolved in 55 lbs. of water. To this mixture there was added an additional 2½ lbs. of harmotome consisting of portions of Samples A and B product of Example I. This admixture was heated to about 140° F. and held at this temperature for 2 hours and then heated to 205–210° F. over an additional 2 hours and held at approximately 45 hours at this temperature. The kettle contents were maintained during the aging period at conditions preventing any appreciable moisture loss. After the 45 hour period at 205–210° F. the mass was cooled to room temperature and subjected to washing with 3 separate batches of water, alkalized with 1% KOH; and subsequently with 5 batches of hot water and then dried for 8 hours at 250° F. A sample of this material was equilibrated to 50% moisture and submitted for X-ray diffraction scanning in the 5°–35° range at 2–2–10² at a rate of 10/minute. The X-ray analysis is reproduced in Table 1 below as columns 1 and 2. In the table the relative intensity peaks are selected with an arbitrary general lower limit of 20 in that no real elements of identification for present purposes appear to reside in peaks having relative intensities below this level.

TABLE 1

| This Invention $K_2O \cdot Al_2O_3 \cdot 3\,SiO_2 \cdot xH_2O$ | | Syn. Phillipsite $Na_2O \cdot Al_2O_3 \cdot 3\,SiO_2 \cdot xH_2O$ | | Barrer et al. species M $K_2O \cdot Al_2O_3 \cdot 3\,SiO_2 \cdot 3\,H_2O$ | | ASTM 13–494 Natural Harmotome $(Ba_{.76}Ca_{.07}K_{.04}Na_{.20}) \cdot Al_2O_3 \cdot 4.2\,SiO_2 \cdot 4.7\,H_2O$ | |
|---|---|---|---|---|---|---|---|
| d, Å. | I/I | d, Å. | I/I | d, Å. | I/I | d, Å. | I/I |
| 8.19 | 25 | | | | | 8.06 | 80 |
| 7.08 | 45 | 7.08 | 85 | 7.2 | w | 7.09 | 60 |
| 7.02 | 50 | | | | | | |
| | | | | | | 6.34 | 80 |
| 5.34 | 25 | | | | | | |
| 5.01 | 45 | 4.98 | 40 | | | 5.01 | 40 |
| 4.35 | 70 | 4.09 | 70 | 4.27 | w | 4.28 | 60 |
| | | | | | | 4.07 | 80 |
| | | | | | | 3.89 | 40 |
| 3.64 | 60 | | | | | 3.67 | 20 |
| | | | | | | 3.59 | 20 |
| | | | | | | 3.53 | 40 |
| | | | | | | 3.46 | 40 |
| 3.25 | 100 | | | 3.28 | vs | 3.23 | 80 |
| 3.16 | 80 | 3.16 | 100 | | | 3.17 | 80 |
| | | | | | | 3.12 | 100 |
| 3.07 | 50 | | | | | 3.08 | 60 |
| 2.95 | 100 | | | 2.96 | s | 2.92 | 60 |
| 2.81 | 45 | | | 2.82 | vw | 2.85 | 40 |
| | | | | | | 2.75 | 60 |
| 2.72 | 55 | | | 2.74 | ms | 2.73 | 80 |
| | | | | | | 2.70 | 100 |
| 2.67 | 30 | 2.67 | 50 | | | | |
| 2.54 | 25 | | | | | | |
| | | | | 2.42 | mw | | |
| | | | | 2.17 | m | | |
| | | 1.96 | vw | | | | |

A portion of the washed materials was dried and submitted for X-ray diffraction analysis with the following results.

d spacing
Å.
8.11
7.00
5.34
5.11
4.43
4.27
3.63
3.24
3.16
2.94
2.72
2.67
2.54

EXAMPLE III

A large batch was prepared as follows:
A Georgia kaolin calcined at a temperature above 950° C. and less than 1200° C. was tested by X-ray diffraction The chemical analysis of this material is as follows:

Percent:                                                           Basis
  Ign. loss after 2 hrs. at 1400° F.—10.08±
    .01 _____ as recd.
  $SiO_2$—40.45±.11 _____ Ignited.
  $Al_2O_3$—42.73±.13 _____ Ignited.
  $K_2O$—17.42±.27 _____ Ignited.

The base exchange capacity was determined to be 4.89+ meq./g. Analysis of the $NH_4$ exchanged K-harmotome showed—

$K_2O$ 0.98% _____ Ignited basis.
$NH_4$ 8.56% _____ Ignited basis.
$NO_3$ 0.43% _____ Ignited basis.

EXAMPLE IV

A portion of ammonium-ion exchanged harmotome of Example III was heat treated at 1050° F. for two hours in an atmosphere of dry air. The heat treated material was charged as catalyst in a reaction zone and tested in the conversion of N-aminoethylpiperazine to diazabicyclo-(2,2,2)-octane as shown below.

| | | | |
|---|---|---|---|
| Reaction temperature, °F | 675 | 700 | 700 |
| L.H.S.V. (liquid hourly space velocity) | 0.4 | 0.4 | 0.4 |
| Charge | (90% NAEP, 10% $H_2O$) | | |
| Pressure, mm. Hg | 760 | 30 | 760 |
| Liquid recovery, percent | 87 | 96.5 | 83.8 |
| Product: | | | |
| Diazabicyclooctane | 28.8 | 28.5 | 29.3 |
| Piperazine | 17.7 | 16.2 | 15.7 |

These data show excellent cyclization activity in a difficult reaction system.

EXAMPLE V

A sample is prepared in a manner similar to that of Example II with the exception that wellsite is substituted for the harmotome seed additive. After aging and preparation for analysis, the X-ray diffraction pattern and the chemical analysis are similar to the results obtained on the product prepared in accordance with Example III above.

A series of experiments showed that the reactive clay identified as an aluminodisilicate derived from kaolin clay should be calcined at a temperature at about 950° C., but less than 1200° C., to yield a product absent of definable X-ray diffraction crystallinity of the type attributable to kaolinite and mullite.

Obviously, many modifications and variations of the invention as hereinbefore set forth may be made without departing from the spirit and scope thereof, and therefore only such limitations should be imposed as are indicated in the appended claims.

What I claim is:
1. The method of preparing a zeolite-containing composition wherein the identifiable zeolite is of the harmotome-type, such method comprising:
   (a) forming an admixture of
      (1) an aluminodisilicate derived from kaolin clay calcined at a temperature above 950° C. but less than 1200° C. for a time sufficient to destroy all kaolinite crystallinity without producing any significant amount of X-ray-definable mullite crystallinity,
      (2) water
      (3) potassium hydroxide, and
      (4) harmotome seed crystals
   said admixture containing on a weight ratio basis of 1, 2, and 3, respectively 1 to 3 aluminodisilicate, 1.5 to 4 of water, and 1 of potassium hydroxide, said potassium hydroxide containing no more than 10% by weight of other alkali metal hydroxide; said admixture further containing an amount of said harmotome seed crystals in the range of 0.5 to 10% by weight, on dry basis, of the weight of said aluminodisilicate;
   (b) subjecting said admixture to aging at conditions including a time period of at least 10 hours at a temperature in the range of ambient temperature to about 120° C., there being no significant reduction in the amount of water originally present at the start of said aging throughout said aging;
   (c) forming by said aging synthetic crystalline zeolite in an amount of at least 10% by weight of dry solids, said synthetic crystalline zeolite identifiable in the potassium form in having an X-ray diffraction pattern similar to and deviating in the $d$ spacing by no more than ±0.1 of the values of the X-ray diffraction pattern as follows:

| $d$ Spacing, A.: | Relative line intensity $I/I_0$ |
|---|---|
| 8.19 | 25 |
| 7.08 | 45 |
| 7.02 | 50 |
| 5.34 | 25 |
| 5.01 | 45 |
| 4.35 | 70 |
| 3.64 | 60 |
| 3.25 | 100 |
| 3.16 | 80 |
| 3.07 | 50 |
| 2.95 | 100 |
| 2.81 | 45 |
| 2.72 | 55 |
| 2.67 | 30 |
| 2.54 | 25 |

(d) and recovering as product of said aging a zeolite-containing composition wherein the identifiable zeolite is of the harmotome-type.

2. The method in accordance with claim 1 wherein said aluminodisilicate has been calcined at temperature of 1025° C.±25° C.; said admixture is formed of 2±0.1 parts by weight of water, 1 part by weight of KOH, and said harmotome seed crystals in an amount equivalent to about 5% by weight, on dry basis, of the weight of said aluminodisilicate.

3. The method in accordance with claim 1 wherein said aging is effected for a time period in the range of 35 to 45 hours at a temperature of about 95° C.

References Cited
UNITED STATES PATENTS

| | | | |
|---|---|---|---|
| 3,391,994 | 7/1968 | Haden et al. | 23—112 |
| 3,119,660 | 1/1964 | Howell et al. | 23—112 |
| 3,140,249 | 7/1964 | Plank et al. | 252—455 X |
| 3,433,587 | 3/1969 | Haden et al. | 23—112 |

FOREIGN PATENTS 864,707  4/1961  Great Britain.

OTHER REFERENCES (1) Barrer et al. (I) "J. Chem. Soc." 1956, pages 2882–2891.

(2) Barrer et al. (II) "J. Chem. Soc."; 1959, pages 195–208.

(3) Barrer et al. (III) "J. Chem. Soc."; 1959, pages 1521–1528.

EDWARD J. MEROS, Primary Examiner

U.S. Cl. X.R.

252—455

PO-1050
(5/69)

UNITED STATES PATENT OFFICE
CERTIFICATE OF CORRECTION

Patent No. 3,545,921     Dated December 8, 1970

Inventor(s) James E. McEvoy

It is certified that error appears in the above-identified patent and that said Letters Patent are hereby corrected as shown below:

Column 1, line 48, "moer" should read --more--

Column 1, line 53, "0.Al$_2$O$_3$4.2" should read --0·Al$_2$O$_3$·4.2--

Column 1, line 67, "derviation" should read --derivation--

Column 3, line 25, "procelain" should read --porcelain--

Column 3, line 50, after "reactive" insert --clay--

Column 3, line 55, change "zeolite" to read --zeolitic--

Column 3, line 69, change "maintenanace" to --maintenance--

Column 4, line 27, after "demonstrating" delete "in"

Column 4, line 64, Under Column C change "3.16" to --3.06--

Column 6, line 22 change "10/minutes" to --1°/minute--

Column 6, line 58 change "40.45" to --40.46--

Column 7, line 48 after "1 to 3" insert --of--

Signed and sealed this 15th day of February 1972.

(SEAL)
Attest:

EDWARD M. FLETCHER, JR.
Attesting Officer

ROBERT GOTTSCHALK
Commissioner of Patents